United States Patent
Roche et al.

(10) Patent No.: US 9,061,466 B2
(45) Date of Patent: Jun. 23, 2015

(54) METHOD AND INSTALLATION FOR CONSTRUCTING A LAYER OF ARMOUR STRIPS

(75) Inventors: Fabien Roche, Deville les Rouen (FR); Guillaume Pironin, Baons le Comte (FR); Etienne Desbazeille, Rouen (FR)

(73) Assignee: TECHNIP FRANCE (FR)

( * ) Notice: Subject to any disclaimer, the term of this patent is extended or adjusted under 35 U.S.C. 154(b) by 992 days.

(21) Appl. No.: 13/055,972

(22) PCT Filed: Jul. 27, 2009

(86) PCT No.: PCT/FR2009/000931
§ 371 (c)(1),
(2), (4) Date: Mar. 24, 2011

(87) PCT Pub. No.: WO2010/012897
PCT Pub. Date: Feb. 4, 2010

(65) Prior Publication Data
US 2011/0174039 A1    Jul. 21, 2011

(30) Foreign Application Priority Data

Jul. 28, 2008  (FR) ...................................... 0804293

(51) Int. Cl.
*B29C 63/08*    (2006.01)
*B21F 17/00*    (2006.01)
(Continued)

(52) U.S. Cl.
CPC ................. *B29C 63/08* (2013.01); *B21F 17/00* (2013.01); *B65H 81/08* (2013.01); *B29C 53/8016* (2013.01); *F16L 11/083* (2013.01)

(58) Field of Classification Search
CPC ............... B21F 3/02; B21F 3/04; B21F 7/00; B21F 17/00; B65H 81/00; B65H 81/06; B65H 81/08; B29C 53/8016; B29C 63/08; F16L 11/083

USPC .............. 140/149; 72/66, 135, 137, 146, 371; 138/129, 137; 156/143; 57/9; 174/108; 29/868
See application file for complete search history.

(56) References Cited

U.S. PATENT DOCUMENTS 1,808,444 A * 6/1931 Zapf .................................. 57/9
1,945,799 A * 2/1934 Blamire ............................ 57/9
(Continued)

FOREIGN PATENT DOCUMENTS

| FR | 2873952 A |   | 2/2006 |   |
|----|-----------|---|--------|---|
| FR | 2877069 A |   | 4/2006 |   |
| GB | 749728 A  | * | 5/1956 | ............ B21C 37/124 |

OTHER PUBLICATIONS

International Search Report dated Dec. 23, 2009, issued in corresponding international application No. PCT/FR2009/000931.
(Continued)

*Primary Examiner* — Edward Tolan
(74) *Attorney, Agent, or Firm* — Ostrolenk Faber LLP (57) ABSTRACT

A method and an installation for constructing a layer (12) of armor strips around a tubular core (10) of a flexible pipe. The installation has a support wheel (14) of a plurality of armor strips (32, 34) having, respectively, two opposite faces (44, 46) and a plurality of pairs of guide members (20, 22). The pairs of guide members include upstream guide members (52, 54) and downstream guide members (56, 58) which sets of guide members extend along axes that are angularly offset from one another. The support wheel (14) has devices (78, 92) for adjusting the downstream guide members (56, 58) into a position such that the two opposite faces (44, 46) of the armor strip entering and leaving the downstream guide members (56, 58) are substantially perpendicular to the plane of flexing (Pf) defined by the entering and leaving armor strip.

23 Claims, 3 Drawing Sheets

(51) Int. Cl.
   *B65H 81/08*   (2006.01)
   *B29C 53/80*   (2006.01)
   *F16L 11/08*   (2006.01)

(56) References Cited

U.S. PATENT DOCUMENTS

| | | | | |
|---|---|---|---|---|
| 2,476,180 | A | * | 7/1949 | Charles .............................. 57/9 |
| 3,717,987 | A | * | 2/1973 | Gilmore et al. .................... 57/9 |
| 3,811,257 | A | * | 5/1974 | Burr .................................. 57/9 |
| 4,590,752 | A | * | 5/1986 | Aubert et al. ...................... 57/9 |
| 4,604,861 | A | * | 8/1986 | Matsuura et al. .................. 57/9 |
| 4,757,700 | A | * | 7/1988 | Dotti et al. ....................... 72/66 |
| 4,802,328 | A | * | 2/1989 | Senyagin et al. .................. 57/9 |
| 2007/0125488 | A1 | | 6/2007 | Brisson et al. |
| 2008/0145583 | A1 | | 6/2008 | Bryant |
| 2009/0050228 | A1 | | 2/2009 | Coutarel et al. |

OTHER PUBLICATIONS

Specification for Unbonded Flexible Pipe, Upstream Segment, API Specification 17J, Second Edition, Nov. 1999, Effective Date: Jul. 1, 2000, American Petroleum Institute.

Recommended Practice for Flexible Pipe, API Recommended Practice 17B, Third Edition, Mar. 2002, American Petroleum Institute.

* cited by examiner

METHOD AND INSTALLATION FOR CONSTRUCTING A LAYER OF ARMOUR STRIPS

CROSS-REFERENCE TO RELATED APPLICATIONS

The present application is a 35 U.S.C. §§371 national phase conversion of PCT/FR2009/000931, filed Jul. 27, 2009, which claims priority of French Application No. 0804293, filed Jul. 28, 2008, the contents of which are incorporated by reference herein. The PCT International Application was published in the French language.

BACKGROUND OF THE INVENTION

The present invention relates to a method and an installation for constructing a layer of armor strips around a tubular core of a flexible pipe for the transport of hydrocarbons.

The flexible pipes concerned are in this instance oil pipes of the unbonded type, as described in standards documents API17J and API RP 17B published by the American Petroleum Institute. These pipes usually comprise, from inside to outside, an inner carcass, an inner sealing sheath, a pressure vault, several plies of tensile armors and an external protective sheath.

The main function of the inner carcass is to absorb the radial crushing forces, for example those associated with hydrostatic pressure. It is made from a profiled metal strip and wound in order to clip together adjacent turns of said metal strip. The inner sealing sheath which covers it is most frequently extruded in plastic directly onto the carcass. The function of this sheath is to confine the fluid flowing in the pipe. As for the pressure vault, it is usually formed of a metal-form strip wound in adjacent turns about the inner sealing sheath. It therefore makes it possible to absorb the radial forces associated with the pressure of the fluid flowing in the pipe. The function of the tensile armor plies is to absorb the tensile forces which are applied to the pipe. These plies consist of armor strips wound helically with a long pitch around the pressure vault. The helix angles of these plies, expressed in absolute value, are less than 60° and more usually less than 55°. In order to balance the structure in torsion, the total number of tensile armor plies is usually even and the plies are criss-crossed.

These armor strips are usually of rectangular section and they therefore have two opposite faces that are substantially parallel with one another and respectively two lateral sides that are opposite to one another. The faces correspond to the two longer sides of the rectangle. The face called the inner face presses on the tubular core situated inside the armor ply concerned.

The difficulty lies in the application of a plurality of armor strips, in order to wind them together around the pressure vault which forms a tubular core with the inner layers that it comprises. And precisely, these armor strips have to be wound and adjusted relative to one another, side to side, so that their inner face presses stably on the tubular core, with the minimum possible residual stresses, in order to prevent a subsequent deformation of the armor ply and a swelling of this ply in particular conditions of use of the flexible pipe.

SUMMARY OF THE INVENTION

Therefore, one problem that arises and that the present invention aims to solve is then to supply a method for constructing a layer of armor strips, around a tubular core, which makes it possible to obtain perfect stability of the armor strips of said layer when the flexible pipe is used.

For the purpose of solving this problem, and according to a first subject, the present invention proposes a method for constructing a layer of armor strips around a tubular core of a flexible pipe designed for transporting hydrocarbons. According to the invention, the method comprises the following steps. First of all a tubular core of a flexible pipe is supplied, said tubular core extending longitudinally along an axis of symmetry, and a plurality of armor strips is supplied having respectively two substantially parallel opposite faces; a plurality of pairs of guide members is also supplied comprising respectively upstream guide members and adjustable downstream guide members. Each armor strip is designed to be stretched between said upstream guide members and said adjustable downstream guide members so as to enter in an entry direction R through said downstream guide members. The upstream and downstream guide members are offset angularly relative to one another that is their axes are offset angularly in order to make it possible to twist the armor strip (32, 34). Then the plurality of armor strips and the plurality of pairs of guide members are rotated in a direction of rotation V around said tubular core. The tubular core is simultaneously driven in translation so as to helically wind the armor strips onto the core, while each of the armor strips is driven in translation through the guide members. The armor strips stretch respectively between the downstream guide members and said tubular core in a direction S for exiting the downstream guide members while causing the flat bending of the armor strip. The exit direction S is inclined relative to an axial plane containing the axis of symmetry of the tubular core and intersecting the downstream guide members. Finally, the adjustable downstream guide members are adjusted so that the two opposite faces of the armor strip entering and exiting the downstream guide members are offset angularly relative to the axial plane in the direction of rotation V, by an angle greater than 90° in order to be able to press the armor strip flat on the tubular core.

Therefore, one feature of the invention lies in the adjustment of the downstream guide members from which the armor strip is bent to join the tubular core and be wound around it, so that this armor strip is essentially bent in a plane perpendicular to the two opposite faces of the armor strip. In this way, the armor strip is bent continuously on a determined radius of curvature without sustaining significant bending on a plane parallel to the two opposite faces. Therefore, the armor strip sustains a first torsional plastic deformation and a second bending plastic deformation, which allows a perfect helical winding of the armor strip against the tubular core in an osculating circle of determined radius. In this way, the inner face of the armor strip has over the whole length of the pipe a cylindrical geometry perfectly matching the shape of the tubular core, which makes it possible to reduce the contact pressures and mechanical stresses endured in service, so that the service life of the pipe is increased.

If precautions are not taken to limit the bending of the armor strip in a component included in a plane parallel to the faces opposite and perpendicular to the sides of the strip, the armor strips are not pressed flat onto the tubular core. But, one of the edges of the armor strip is in contact with the tubular core, while its opposite edge is free and spaced from the tubular core, which has the drawback of reducing the area of contact between the armor strips and the tubular core and therefore of generating concentrations of mechanical stresses.

In addition, a bending plastic deformation of the armor strip needs to be impressed on a radius of curvature smaller than the radius of the osculating circle, so that the armor strip tends to grip the tubular core. The radius of the osculating circle is quite clearly directly associated with the radius of the tubular core and with the winding angle of the armor strip relative to the axis of the tubular core as will be explained below. In this way, the tensile armor ply is stable and does not tend to swell violently like a spring when it is free to do so. This instability is associated with an insufficient flat bending plastification of the armor strips, which is associated with an excessive rate of residual stresses. This phenomenon must be avoided because it may pose a safety problem during the operations of installing end fittings. However, this phenomenon has no significant influence on the service performance of the flexible pipe, because these residual stresses reduce greatly during the pressure test carried out at high internal pressure before said pipe is placed in service.

According to one particularly advantageous embodiment of the invention, said entry and exit directions defining a bending plane Pf, said adjustable downstream guide members are adjusted so that the two opposite faces of the armor strip entering and exiting said downstream guide members are offset angularly relative to said bending plane in said direction of rotation V, by an angle greater than or equal to 90°, for example greater than 95°.

In this way, the armor strip is bent only in a component included in the plane perpendicular to its two opposite faces which allows the strip to be pressed more flat on the tubular core. At first sight, such a bending should be able to be obtained by adjusting said downstream guide members so that the two opposite faces of the entering and exiting armor strip are offset angularly relative to the bending plane, by an angle equal to 90°. But this is not the case, because the armor strip exiting the downstream guide members has a twist so that the bending stresses that it sustains are not applied with the same intensity over the whole of its width.

Moreover, means for adjusting said downstream guide members are also supplied, as will be explained in detail below, making it possible to adjust them when the method is used.

Advantageously, said armor strip is guided through said downstream guide members between two first mobile, opposite deformation surfaces in order to reduce the friction forces exerted on the armor strips. For the same reasons, said armor strip is preferably guided through said upstream guide members between two second opposite deformation surfaces that are also mobile. According to a particularly advantageous embodiment, the aforementioned deformation surfaces are circular. In order to do this, said downstream guide members advantageously comprise a first pair of rollers mounted rotatably, said first rollers having axes of rotation that are parallel with one another and first facing roll bands. Said armor strip is then designed to be driven in translation between said first rollers, said first roll bands respectively pressing against said opposite faces so that the first rollers are driven in rotation in opposite directions as the armor strip is driven between the two. It will be noted that it is from these first rollers that the armor strip is driven bent toward the tubular core and that consequently one of these rollers forms a bearing element on which considerable deflection forces are applied for the bending action as will be explained in greater detail in the rest of the description. In addition, said upstream guide members preferably comprise a second pair of second rollers also mounted rotatably. Said second rollers have parallel axes of rotation and second facing roll bands. There also, said armor strip is designed to be driven in translation between said second rollers, said second roll bands respectively resting against said opposite faces. On the other hand, it will be noted here that the armor strip is brought between the second rollers in a direction that is substantially indistinguishable from that of the armor strip stretched between the downstream guide members and the upstream guide members. Therefore, the forces that are then applied on these second rollers are substantially equivalent and much less than the aforementioned deflection forces which are applied to one of the first rollers of the first pair of rollers.

According to one particularly advantageous embodiment of the invention, the guide members of said plurality of guide members are held in a fixed position relative to one another and spaced from one another around said tubular core. Therefore, each armor strip of the plurality of armor strips is guided through the guide members without the armor strips being made to cross. They simply fit side to side on the tubular core. Preferably, said upstream and downstream guide members are mounted so as to be able to rotate relative to one another about one and the same axis of rotation so as to be able to impose a torsional stress on the armor strip, as a function of the angular offset between the two guide members. Quite clearly, these guide members are capable of being held in a fixed position relative to one another in order to impose a determined torsion. According to a particular embodiment, said upstream and downstream guide members are adjusted so that said one and the same axis of rotation is oriented substantially parallel to said tubular core. Moreover, and particularly advantageously, said first deformation surfaces are inclined perpendicularly to the bending plane which contains said axis of rotation and extends tangentially to said tubular core, because the armor strips, when leaving respectively their downstream guide member, are oriented in a direction which is not that of the center of the tubular core but that of its periphery where the armor strips are wound. This direction is included in the bending plane defined by the aforementioned axis of rotation which extends between the two guide members, and the straight line intersecting this axis of rotation and which is applied tangentially to the tubular core. This bending plane quite clearly moves away from the axial plane of the pipe containing the aforementioned axis of rotation.

According to a second subject, the present invention proposes an installation for constructing a layer of armor strips around a tubular core of a flexible pipe designed for transporting hydrocarbons, said tubular core stretching longitudinally along an axis of symmetry. According to the invention, the installation comprises a supporting wheel having a central recess in order to allow said tubular core to pass through said wheel, said wheel comprising storage means for storing a plurality of armor strips having respectively two substantially parallel opposite faces, and a plurality of pairs of guide members mounted around said central recess. Said pairs of guide members comprise respectively upstream guide members and downstream guide members, each armor strip being designed to be stretched between said upstream guide members and said downstream guide members so as to enter in an entry direction through said downstream guide members. Said upstream and downstream guide members are offset angularly relative to one another in order to make it possible to twist the armor strip. Said tubular core and said wheel are designed to be driven simultaneously, said tubular core through said central recess and said wheel in rotation about said tubular core in a direction of rotation V, so as to helically wind said armor strips onto said core, while each of said armor strips is driven in translation through said guide members, said armor strips stretching respectively between the downstream guide members and said tubular core in a direction for exiting said downstream guide members while causing the flat bending of said armor strip, said exit direction S being inclined relative to an axial plane containing said axis of symmetry of said tubular core and intersecting said downstream guide members. Moreover, said wheel also comprises means for adjusting said downstream guide members in order to adjust said downstream guide members so that the two opposite faces of the armor strip entering and exiting said downstream guide members are offset angularly relative to said axial plane in said direction of rotation V, by an angle greater than 90° in order to be able to press said armor strip flat on said tubular core.

Therefore, a feature of the invention according to this second subject lies in the use of adjustment means making it possible to adjust and hold in position the downstream guide members from which the armor strip is bent in order to join the tubular core, in a position such that this armor strip can be bent essentially in a plane perpendicular to the two opposite faces of the armor strip.

According to a preferred embodiment, said entry and exit directions defining a bending plane Pf, said adjustment means make it possible to adjust said adjustable downstream guide members so that the two opposite faces of the armor strip entering and exiting said downstream guide members are offset angularly relative to said bending plane in said direction of rotation V, by an angle greater than or equal to 90°. In addition, and as will be explained in greater detail in the rest of the description, said downstream guide members advantageously comprise a first pair of first rollers, said first rollers having parallel axes and first facing roll bands, said armor strip being designed to be driven in translation between said first rollers, said first roll bands respectively pressing against said opposite faces. Moreover, said upstream guide members preferably comprise a second pair of second rollers, said second rollers having parallel axes and second facing roll bands, said armor strip being designed to be driven in translation between said second rollers, said second roll bands respectively pressing against said opposite faces.

Moreover, and according to a particularly advantageous embodiment, said adjustment means comprise a U-shaped part forming a yoke, said U-shaped part having two facing flanges, one of said flanges having a shaft which extends substantially perpendicularly to said flanges and away from the other of said flanges, said shaft being mounted rotatably on said wheel about an axis perpendicular to said wheel, while said downstream guide members are mounted on the other flange of said flanges. Therefore, the downstream guide members are held apart from the supporting wheel by virtue of the U-shaped part, and in addition they can be adjusted in rotation since the U-shaped part is itself mounted rotatably on the supporting wheel about an axis which perpendicularly intersects the two flanges of the U-shaped part. The latter advantageously has a web connecting said flanges, said one of said flanges having a free end opposite to said web, said free end having meshing means in order to drive said U-shaped part to pivot about said shaft. In this way, by driving the free end of the U-shaped part on a plane perpendicular to the aforementioned shaft, the U-shaped part and the downstream guide members are driven thereby. To do this, said adjustment means also comprise a gearwheel mounted coaxially and moveable in rotation against said supporting wheel, and said gearwheel has teeth capable of interacting with said meshing means of said free end of said one of said flanges. Therefore, the gearwheel which is mounted so as to be adjustable in rotation relative to the supporting wheel is capable of being rotated relative to the supporting wheel in order precisely to mesh the meshing means of the free end of the flange of the U-shaped part and therefore pivot this U-shaped part to cause the rotation of the downstream guide members. Moreover, the gearwheel advantageously meshes with all the free ends of the flanges of the U-shaped parts of said plurality of pairs of guide members placed on the supporting wheel so as to be able to simultaneously adjust all the downstream guide members. Advantageously, said U-shaped part is installed on said wheel so that said free end is oriented toward the center of said supporting wheel, while the web of the U-shaped part is oriented away from the center and thus the gearwheel is of a relatively simple design and it extends between the central recess and the free ends with which it meshes.

Moreover, said shaft has an extension which passes through said one of said flanges and which extends inside said U-shaped part toward said other flange, and said upstream guide members are mounted rotatably on said extension facing said downstream guide members so as to be able to be held in a fixed position, while the downstream guide members for their part are rotated. Moreover, said upstream guide members are fitted with a ring gear mounted coaxially on said extension in order to be able not only to hold the upstream guide members in a fixed position relative to the downstream guide members when the latter are rotated, but also in order to control the inclination of said upstream guide members independently. Therefore, the object of the invention is to be able to adjust in rotation the downstream guide members in order to control the flat bending of the armor strip as indicated above. But by virtue of the aforementioned features, it is also possible to independently adjust the angle of twist impressed on the armor strip. To do this, said supporting wheel comprises another gearwheel mounted coaxially and moveable in rotation on said supporting wheel, said other gearwheel being suitable for meshing said ring gear and also to simultaneously mesh the ring gear of each upstream guide member of said plurality of guide members.

Therefore, said shaft and said extension have an axial bore to form a path for said armor strip to pass through, which path also passes axially through the supporting wheel behind which the storage means are installed. As will be explained below, the armor strips are stored on one side of the supporting wheel and they pass through it in order to be engaged directly in the guide members so as to subsequently be wound helically onto the tubular core.

Other particular features and advantages of the invention will emerge on reading the following description of a particular embodiment of the invention, given as an indication but not being limiting, with reference to the appended drawings in which:

DESCRIPTION OF A PREFERRED EMBODIMENT

Figures 1, 2:
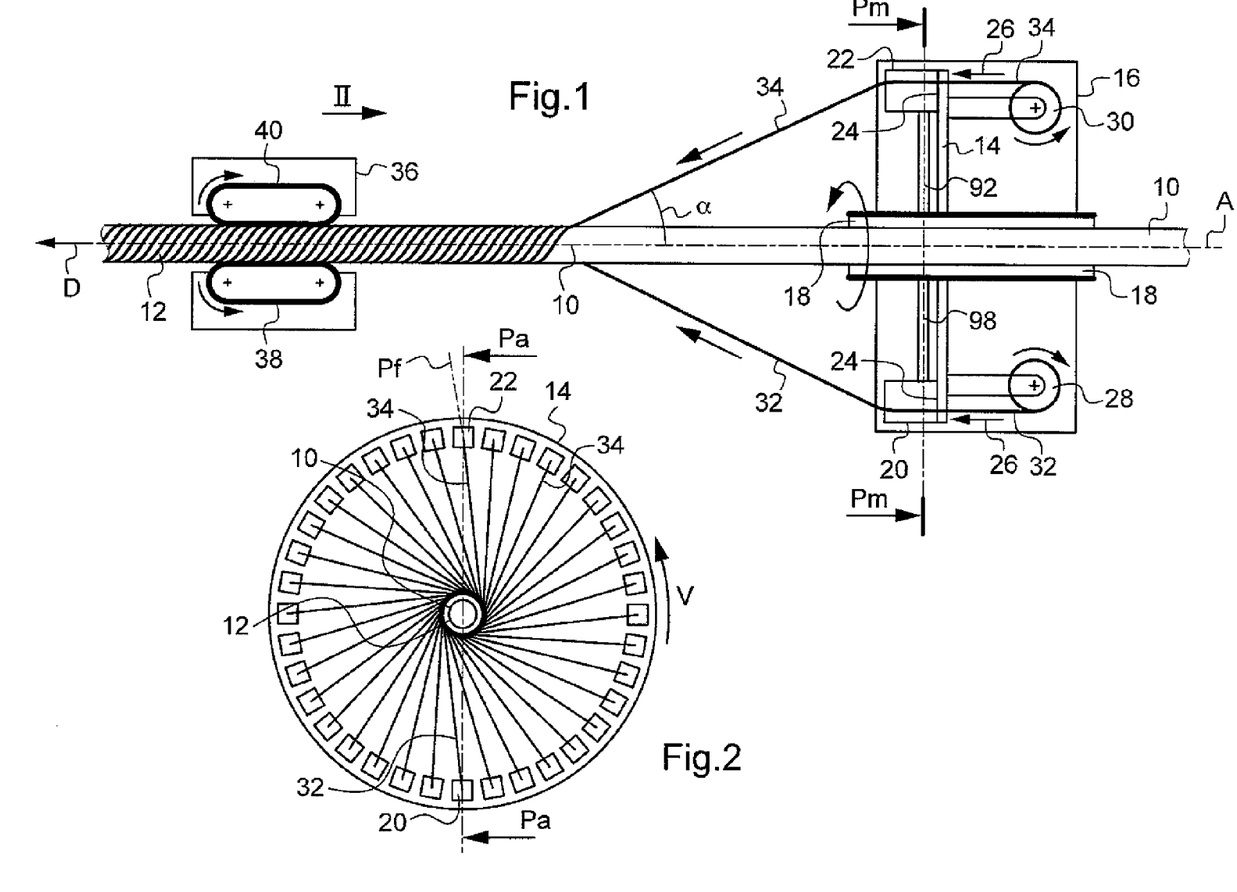
FIG. 1 is a schematic view in axial section of a construction installation according to the invention.
FIG. 2 is a schematic front view in direction II of the installation shown in FIG. 1.

FIG. 1 illustrates schematically a construction installation according to the invention making it possible to form, around a tubular core 10, a ply or layer of armor strips 12. The installation comprises a supporting wheel 14 suitable for being rotated about its axis of symmetry A, which is indistinguishable from the axis of symmetry of the tubular core 10. The supporting wheel 14 is housed inside a protective cage 16 which is secured thereto, and it has a central recess 18 through which the tubular core 10 extends. Moreover, appearing in the section shown in FIG. 1 very schematically are two pairs of diametrically opposed guide members 20, 22, installed on a front peripheral edge 24 of the supporting wheel 14 that will be explained in detail hereafter with reference to FIG. 3. The front peripheral edge 24 of the supporting wheel 14 is opposite to a rear peripheral edge 26 facing which, in line with the diametrically opposed pairs of guide members 20, 22, are respectively installed reels 28, 30 of armor strips. These armor strips have a substantially rectangular section and consequently two substantially parallel opposite faces and two opposite lateral sides. Further information on these armor strips will be given in the rest of the description. Thus, the two reels 28, 30 are capable of delivering two armor strips 32, 34 which pass through the supporting wheel 14 at the two opposite edges 24, 26 in order to emerge respectively in the diametrically opposed pairs of guide members 20, 22. Then, the armor strips 32, 34 freely join without particular guidance the tubular core 10 forming a given angle α with the axis of symmetry A in order to form the armor ply 12.

First of all, FIG. 1 shows, in the sectional plane, only the two reels 28, 30 of armor strips 32, 34 and respectively the two pairs of diametrically opposed guide members 20, 22. The supporting wheel 14 is fitted with a plurality of armor-strip reels and of corresponding pairs of guide members in its two opposite peripheral edges 24, 26 as will be explained hereafter with reference to FIG. 2. Then, the tubular core 10 covered with the armor ply 12 is made suitable for being driven in translation longitudinally relative to the supporting wheel 14 on the axis of symmetry A and in the direction D, from the rear peripheral edge 26 to the front peripheral edge, by virtue of pulling means 36 comprising in this instance two opposite belt pullers 38, 40, while simultaneously the supporting wheel 14 is rotated with its plurality of armor-strip reels and corresponding pairs of guide members so as to helically wind the armor strips around the tubular core 10. Quite clearly, the supporting wheel 14 defines a midplane Pm, and it is rotated in this plane which is substantially perpendicular to the direction of driving of the tubular core 10. In this way the armor ply 12 is formed. The speed of rotation of the supporting wheel 14 and the speed of advancement of the tubular pipe 10 determine the value of the aforementioned angle α and consequently the value of the helix pitch of the armor strips. The value of this angle α is less than 60° and more precisely less than 55°. The armor strips being wound pressing sides against sides, the helix pitch is the same for all the armor strips.

Reference will now be made to FIG. 2, illustrating schematically in an enlarged front view the supporting wheel 14. This contains the tubular core 10 covered by the armor ply 12 being formed. Also shown, diametrically opposed, are the two pairs of guide members 20, 22 and respectively the two armor strips 32, 34 that they guide. Moreover, and according to the embodiment illustrated in this FIG. 2, thirty-six armor strips pass through respectively thirty-six 36 pairs of guide members to subsequently be pressed, in a manner totally identical to the aforementioned two armor strips 32, 34, around the tubular core 10. It will be observed that the supporting wheel 14 is rotated in a direction V in a counterclockwise manner and that the armor strips 32, 34 stretch not in a radial direction included in an axial plane Pa between the pairs of guide members 20, 22 and the tubular core 10, but in a direction that is inclined relative to this axial plane Pa since the armor strips 32, 34 are pressed tangentially onto the tubular core 10.

Figure 3:
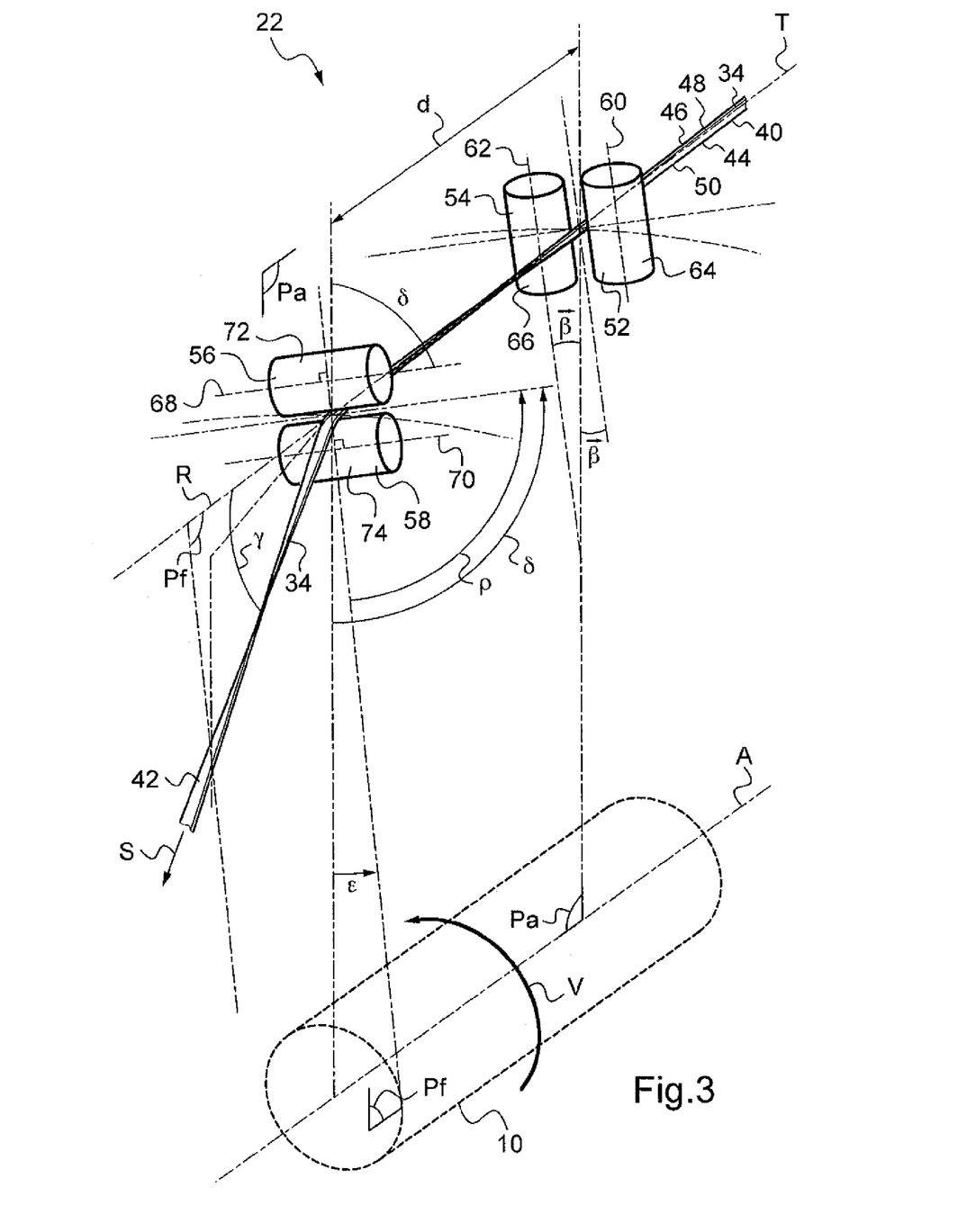
FIG. 3 is a schematic view of an outline and a detail in exploded perspective of an element shown in FIG. 2.

Reference will now be made to FIG. 3, which illustrates in detail the various elements of the pair of guide members 22 and its operating principle. First of all, FIG. 3 shows the axis of symmetry A of the tubular core 10 indistinguishable from the axis of rotation of the supporting wheel 14 and the axial plane Pa including the axis of symmetry A. The direction of rotation V of the supporting wheel is also shown. In this example, it is counterclockwise. Moreover, this FIG. 3 also shows the armor strip 34 with an upstream portion 40 situated toward its corresponding armor-strip reel 30, but not shown, and a downstream portion 42 oriented toward the tubular core 10. The armor strip is delivered from its armor-strip reel 30 in a direction T substantially parallel to the axis of symmetry A of the tubular core 10 and at a distance from this tubular core 10, for example two meters fifty. This armor strip 34 has two opposite faces, one face 44 appearing in the figure and the other face 46 at the rear of the figure, and two opposite lateral sides, one side 48 appearing in the figure and the other side 50 situated at the rear of the figure. The armor strip 34 is therefore delivered so that its two opposite faces 44, 46 are substantially parallel to the axial plane Pa.

The pair of guide members 22 has upstream guide members 52, 54 and downstream guide members 56, 58. These upstream guide members 52, 54 and downstream guide members 56, 58 comprise respectively two upstream rollers 52, 54 and two downstream rollers 56, 58. These rollers consist of identical rollers.

The two upstream rollers 52, 54 are suitable for being rotated about their respective upstream axes of rotation 60, 62 which are substantially parallel. These two rollers 52, 54 have respectively a roll band 64, 66 and they are adjusted at a distance from one another so that their roll bands 64, 66 are spaced from one another at a distance equivalent to the thickness of the armor strip 34, namely from the edges 48, 50. In FIG. 3, the two upstream rollers 52, 54 are spaced from one another by a greater distance for the clarity of the drawing. Moreover, the two upstream axes of rotation 60, 62 of the two upstream rollers 52, 54 are not only parallel with one another, but also included in a plane substantially parallel to the midplane Pm of the supporting wheel 14 and consequently perpendicular to the axis of rotation A of the supporting wheel 14. Moreover, the two upstream axes of rotation 60, 62 are capable of being inclined relative to the axial plane Pa in the direction of rotation V at an angle β of between 0 and 180°. In the embodiment shown in this figure, the angle β has a value close to 10°, so that the armor strip 34 held between the two rollers 52, 54 is itself inclined at this same angle β relative to the axial plane Pa. The value of such an inclination will be explained below. The two upstream rollers 52, 54 are rotated in directions opposite to one another by means of the armor strip 34 which for its part is pulled toward the two downstream rollers 56, 58 in a direction R indistinguishable from the direction T for delivering the armor strip 30, which is substantially parallel to the axis of symmetry A of the tubular core 10.

The two downstream rollers 56, 58 are designed to be rotated about their respective downstream axes of rotation 68, 70 which are also parallel with one another. They have respectively a roll band 72, 74 and they are adjusted at a distance from one another so that their roll bands 72, 74 are spaced from one another at a distance, here also, equivalent to the thickness of the armor strip 34. The two downstream axes of rotation 68, 70 are parallel with one another and included in a plane substantially parallel to the midplane Pm of the supporting wheel 14 and also perpendicular to the axis of rotation A of the supporting wheel 14. Moreover, the armor strip 34 which stretches between the two pairs of rollers 52, 54; 56, 58, enters in an entry direction indistinguishable from the directions T and R of the armor strip through the two downstream rollers 56, 58 on the roll bands 72, 74 from which respectively the two opposite faces 44, 46 of the armor strip 34 press. It reexits therefrom in an exit direction S leaving the two downstream rollers 56, 58, included here, in the bending plane Pf and above all, inclined relative to the direction R of the armor strip stretched between the two pairs of rollers 52, 54; 56, 58. The armor strip 34 is thus bent in a flat bend in this bending plane Pf and it subsequently joins, in the exit direction S, the tubular core 10 in order to be pressed tangentially thereon. The bending plane Pf therefore contains the straight lines R and S.

The angle $\epsilon$ is the angle of inclination of the bending plane Pf relative to the axial plane Pa in the direction of rotation V. It depends on the one hand on the radius of the tubular core 10 and on the other hand on the distance separating the axis of rotation A from the straight line R. In practice, this distance is of the order of 2.5 m and the radius of the tubular core 10 is of the order of 10 to 30 cm, such that the angle $\epsilon$ typically varies between 2° and 7°. The angle $\delta$ is the angle of inclination of the two downstream axes of rotation 68, 70 relative to the axial plane Pa in the direction of rotation V. The angle $\delta$ is also equal to the angular offset of the two opposite faces 44, 46 of the armor strip 34 entering and exiting the downstream guide members 56, 58 relative to the axial plane Pa in the direction of rotation V. The angle $\rho$ is the angle of inclination of the two downstream axes of rotation 68, 70 relative to the bending plane Pf in the direction of rotation V. The angle $\rho$ is also equal to the angular offset of the two opposite faces 44, 46 of the armor strip 34 entering and exiting the downstream guide members 56, 58 relative to the bending plane Pf in the direction of rotation V. Consequently, the angle $\delta$ is equal to the sum of the angles $\epsilon$ and $\rho$.

In the configuration shown in FIG. 3, the two downstream axes of rotation 68, 70 are substantially perpendicular to the bending plane Pf containing the direction R of the armor strip 34 that is stretched between the two pairs of rollers 52, 54; 56, 58 and that presses tangentially onto the tubular core 10. In this case, the angle $\rho$ is equal to 90° and the angle $\delta$ is for its part typically between 92° and 97°. Therefore, the downstream pair of rollers 56, 58 is mounted adjustably as will be explained below, and it is adjusted in a position such that the axes of rotation 68, 70 of the rollers are perpendicular to the bending plane Pf, precisely as a function of the exit direction S of the armor strip 34 which defines this bending plane Pf. Because the object of the method according to the invention, according to a particularly advantageous feature, is to impress a flat bend on the armor strip 34 in a plane perpendicular to its two opposite faces 44, 46 while preventing a bending of the armor strip 34 in a perpendicular component, comprised in a plane parallel to the opposite faces 44, 46 and perpendicular to the sides of the strip. It can be understood that the orientation of the downstream pair of rollers 56, 58 between which the two opposite faces 44, 46 of the armor strip 34 are gripped makes it possible to precisely adjust the lateral orientation of the armor strip 34, in a plane perpendicular to the direction R of the armor strip stretched between the two pairs of rollers 52, 54; 56, 58 and relative to the plane Pf of deformation of the armor strip 34. Therefore, the downstream pair of rollers 56, 58 is oriented in this position in order to prevent the lateral bending of the armor strip 34. Tests have shown that this embodiment of the invention is suitable for the production of armor plies the strips of which have a high yield strength, typically more than 900 MPa.

According to a particularly advantageous variant embodiment, notably when the armor strip has a low yield strength, typically less than 600 MPa, the axes of rotation 68, 70 of the downstream rollers are adjusted in order to adjust said downstream guide members 56, 58 so that the two opposite faces of the armor strip entering and exiting said downstream guide members are offset angularly relative to the bending plane Pf in the direction of rotation V of the wheel, by an angle greater than 90°, for example 95°. This means that the angle $\rho$ defined above is in this case adjusted to a value greater than 90°, for example greater than 95°. Such an adjustment is obtained by adjusting the axes of rotation 68, 70 of the rollers in a direction that is inclined by more than 95° relative to the bending plane Pf in the direction of rotation V. Tests have shown that in the case of armor strips with a low yield strength the best results are obtained when the angle $\rho$ is between 95° and 105°, advantageously of the order of 100°. In this case, the angle $\delta$ is typically between 97° and 112° depending on the diameter of the tubular core 10. Moreover, the optimum angle $\delta$ for these strips with a low yield strength is of the order of 100° to 105°.

It will be noted that the axes of rotation 68, 70 of the rollers are capable of being adjusted in an angular position $\delta$ for example of between 70° and 110°. The adjustments less than 90° make it possible to change the direction of rotation of the supporting wheel without having to change the guide members (an angle $\delta$ of 105° in a given direction of rotation being for example equivalent to an angle of 75° in the opposite direction of rotation). These values being relatively close to 90° also makes it possible to use downstream rollers 56, 58 that are smooth having no groove to guide the armor strip 34 since the axis of rotation of these rollers is virtually perpendicular (to within) 20°) to the bending plane Pf, so that the armor strip 34 is pressed flat on these rollers, does not tend to slide laterally along said rollers, and also does not rub laterally against their support which will be described below.

The angle $\gamma$ between the straight lines R and S is the bending angle of the armor strip 34. It determines the amplitude of the bending plastic deformation impressed on the armor strip. The latter is also determined by the tension forces applied to the armor strip 34, and also by the radius of the downstream roller 58 against which the armor strip 34 is bent. The tension forces are very largely determined by the friction forces of the armor strip between the pairs of rollers 52, 54; 56, 58, which have an intensity of the order of 100 to 300 daN. Motorization of the rollers could reduce these tension forces. It will be observed that the bending angle $\gamma$ could also be adjusted by radially moving the downstream pair of rollers 56, 58 closer to or further from the tubular core 10.

In any case, a plastic deformation should be impressed on the armor strip 34 that is equivalent to a radius of curvature corresponding to the radius of the osculating circle of the armor strip 34 wound around the tubular core 10. More precisely, it is preferable to impress a plastic deformation with a radius of curvature smaller than the radius of the osculating circle so that the armor strip wound helically around the tubular core 10 tends to grip it rather than the latter being relatively loose inside the turns of the plurality of armor strips. It will be noted that the radius of the osculating circle, or radius of curvature of the armor strip wound helically around the tubular core 10, quite clearly varies depending on the diameter of this tubular core and also depending on the winding angle or lay angle. Typically, for an oil pipe, this radius is for example between half a meter and two meters.

Moreover, and as illustrated in FIG. 3, the upstream axes of rotation 60, 62 of the upstream rollers 52, 54 are substantially perpendicular to the axes of rotation 68, 70 of the downstream rollers 56, 58. In this way, a torsional plastic deformation is impressed on the armor strip 34. By virtue of this torsional plastic deformation, combined with the aforementioned flat bending of the armor strip 34, on a bending plane perpendicular to its two opposite faces 44, 46 that has been impressed on it by a bending plastic deformation, at every point of the armor strip 34, perpendicular to the opposite faces 44, 46, the armor strip 34 is then pressed flat onto the tubular core 10 as illustrated in FIG. 4.

Figure 4:
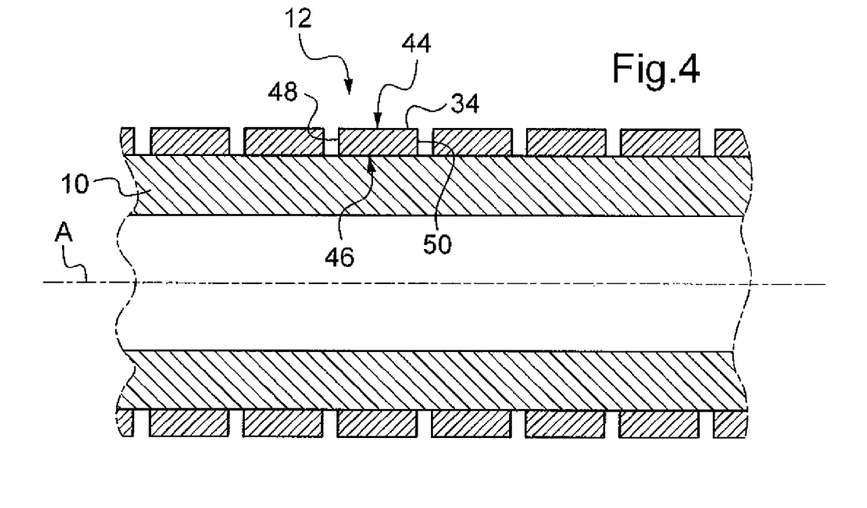
FIG. 4 is a schematic view in axial section of the product obtained by virtue of the installation shown in FIG. 1; and, FIG. 5 is a schematic view in perspective of the element shown in FIG. 3.

This FIG. 4 illustrates in axial section the tubular core 10 covered with the armor ply 12. The inner face 46 of the armor strip 34 is pressing flat on the tubular core 10. This would not have been the situation if the armor strip 34 had been bent on a component parallel to the two opposite faces 44, 46 and perpendicular to the sides 48, 50. The armor strip would specifically have one edge resting on the tubular core 10 and the opposite edge free, at a distance from the tubular core 10. This "tile" arrangement is inconvenient because of the concentrations of stress that it generates. It is specified here that the adjustment of the angular position of the downstream pair of rollers 56, 58 relative to the exit direction S of the armor strip 34 is all the more necessary when the armor strip has a low yield strength Re, typically less than 600 MPa.

Figure 5:
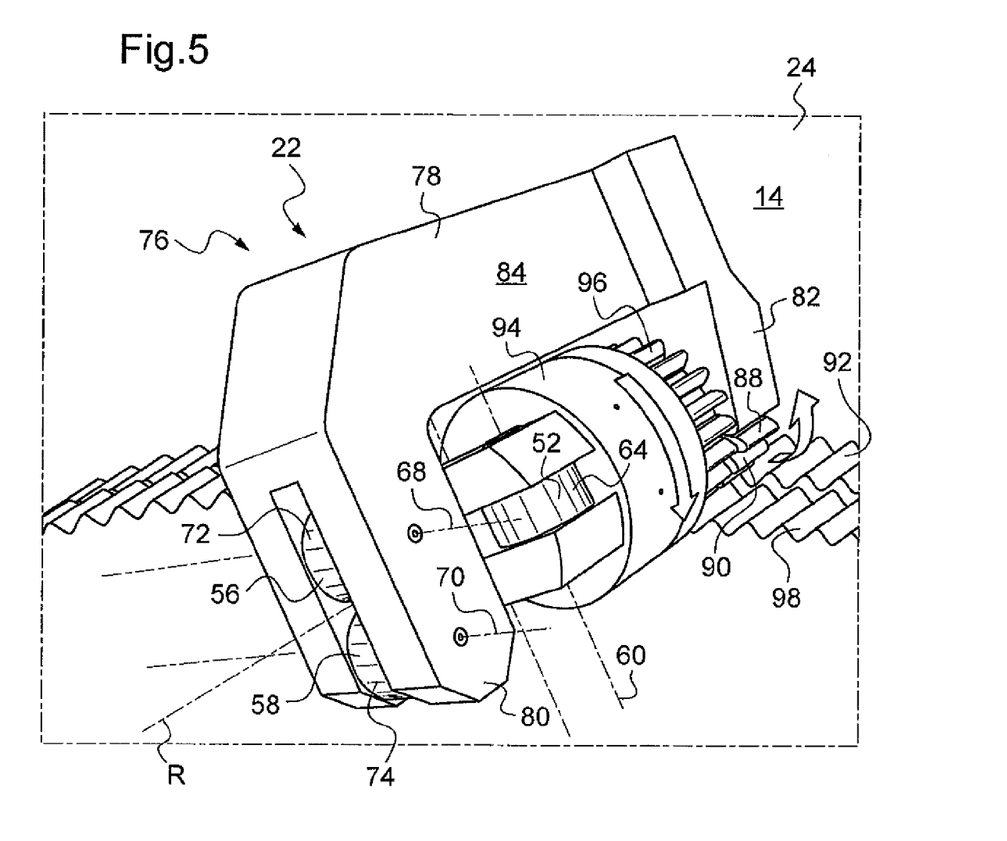

Reference will now be made to FIG. 5, which shows in detail means 76 for adjusting the relative angular position of the upstream pairs of rollers 52, 54 and of the downstream pair of rollers 56, 58. A single guide member 22 is shown here to make the description easier, and FIG. 5 also shows an edge portion 24 of the supporting wheel 14.

Therefore, these adjustment means 76 comprise first of all a U-shaped part forming a yoke 78. This U-shaped part 78 has two opposite flanges, a first flange 80 that is free and a second flange 82 that is secured to the edge portion 24 of the supporting wheel 14. The two flanges 80, 82 are connected together by a web portion 84 which extends substantially perpendicularly to the supporting wheel 14 and in particular to the edge portion 24. This FIG. 5 shows the direction R of the armor strip that is capable of being stretched between the two pairs of rollers 52, 54; 56, 58. The first free flange 80 forms a first fork inside which the downstream pair of rollers 56, 58 is installed. The respective axes of rotation 68, 70 and the respective roll bands 72, 74 of the downstream rollers 56, 58 are shown in FIG. 5. The armor strip will precisely be bent on the roll band 74 of the downstream roller 58.

Moreover, the second flange 82 has a shaft not shown which extends perpendicularly to the second flange 82 and away from the free flange 80 and which is mounted rotatably through an orifice made in the peripheral edge portion 24. The U-shaped part 78 can then rotate about an axis indistinguishable from the direction R of the armor strip 34.

Moreover, the second flange 82 has a free end 88 of semicircular symmetry having meshing means formed of teeth 90 arranged symmetrically around the axis of rotation indistinguishable from the direction R. Moreover, the adjustment means also comprise a first gearwheel 92 installed coaxially and moveable in rotation against the supporting wheel 14 and which in addition meshes with the teeth 90 of the free end 88. Quite clearly this first gearwheel 92 meshes with the teeth of the free ends of the second flanges of each of the U-shaped parts installed side by side in the peripheral edge portion 24. Therefore, the rotation of the gearwheel 92 relative to the supporting wheel 14 makes it possible to simultaneously rotate all the U-shaped parts 78 and thus to adjust the orientation of the downstream pair of rollers 56, 58 in a position as shown in FIG. 3.

Moreover, the upstream pair of rollers 52, 54 is installed on a supporting ring 94 which is mounted rotatably on an extension of the aforementioned shaft which passes through the second flange 82 and which extends between the two flanges 80, 82 on the axis R of the armor strip 34. In FIG. 5, the upstream roller 54 is not shown because it is hidden by the U-shaped part 78. However, the axis 60 and the roll band 64 of the upstream roller 52 are shown. The supporting ring 94 has, on one side, a second fork inside which the upstream pair of rollers 52, 54 is installed and on the other side a toothed portion 96 forming a ring gear coaxial with the extension on the axis R. Moreover the supporting wheel 14 is fitted with a second gearwheel 98 which is installed coaxially against the first gearwheel 92 and is moveable in rotation and meshing with the toothed portion 96 of the supporting ring 94. Here also, this second gearwheel 98 meshes with the toothed portions of all the supporting rings installed on the plurality of U-shaped parts. Therefore, the gearwheels 92, 98 are mounted adjustably in rotation on the supporting wheel 14 independently of one another. Moreover, the supporting ring 94 itself being moveable in rotation relative to the U-shaped part 78, which is also capable of pivoting relative to the supporting wheel 14, the rotational drivings of the gearwheels 92, 98 make it possible respectively to adjust the angular position of the U-shaped part 78 and of the supporting ring 94 independently of one another. Consequently, these gearwheels 92, 98 make it possible to adjust the relative orientation in rotation of the upstream pair of rollers 52, 54 and of the downstream pair of rollers 56, 58 about the axis R of the armor strip 34. Although they do not appear in the figure, the extension of the shaft and the shaft itself cited above are bored axially in order to form a path to allow the armor strip 34 to pass through the edge portion 24 and then between the two upstream rollers 52, 54 at the exit of said path so that it can then come into engagement between the two downstream rollers 58, 56 and finally leave them.

According to one variant embodiment, provision is made for the use of timing belts to drive simultaneously the U-shaped parts and the supporting rings.

The invention claimed is:

1. A method for constructing a layer of armor strips around a tubular core of a flexible pipe for transporting hydrocarbons, the method comprising:

supplying a tubular core of a flexible pipe, said tubular core extending longitudinally along an axis of symmetry;

supplying a plurality of armor strips, each strip having two substantially parallel opposite faces;

supplying a plurality of guide devices, each guide device comprising upstream guide members and adjustable downstream guide members arrayed along a path of said armor strips;

stretching, each armor strip between said upstream guide members and said adjustable downstream guide members, and said armor strips enter in an entry direction through said downstream guide members;

orienting said upstream and downstream guide members with axes offset angularly relative to one another so as to twist the armor strip;

rotating said plurality of armor strips and said plurality of guide devices in a direction of rotation around said tubular core and simultaneously driving said tubular core in translation so as to helically wind said armor strips onto said core, while driving each of said armor strips in translation through said guide devices, said armor strips stretching respectively between said downstream guide members and said tubular core in an exit direction for exiting said downstream guide members while causing flat bending of said armor strip, wherein said exit direction is inclined relative to an axial plane containing said axis of symmetry of said tubular core and intersects said downstream guide members; and, adjusting said adjustable downstream guide members so that the two opposite faces of the armor strip entering and exiting said downstream guide members are offset angularly relative to said axial plane in said direction of rotation by an angle greater than 90° such that said armor strip is pressable flat on said tubular core.

2. The construction method as claimed in claim 1, wherein said entry and exit directions define a bending plane, and the adjusting said adjustable downstream guide members is performed such that the two opposite faces of the armor strip entering and exiting said downstream guide members are offset angularly relative to said bending plane in said direction of rotation by an angle greater than or equal to 90°.

3. The construction method as claimed in claim 2, wherein the adjusting said downstream guide members is performed such that the two opposite faces of the armor strip entering and exiting said downstream guide members are inclined relative to said bending plane by an angle greater than 95°.

4. The construction method as claimed in claim 1, further comprising supplying a device for adjusting said downstream guide members.

5. The construction method as claimed in claim 1, wherein the downstream guide members comprise a pair of downstream guide members, the method further comprising guiding said armor strip through said pair of downstream guide members between two first mobile, opposite deformation surfaces.

6. The construction method as claimed in claim 5, wherein the upstream guide members comprise a pair of upstream guide members, the method further comprising guiding said armor strip through said pair of upstream guide members between two second mobile, opposite deformation surfaces.

7. The construction method as claimed in claim 6, wherein said deformation surfaces are circular.

8. The construction method as claimed in claim 6, further comprising holding said guide devices of said plurality of guide devices in a fixed position and spaced from one another around said tubular core.

9. The construction method as claimed in claim 7, further comprising mounting said upstream and downstream guide members to be able to rotate relative to one another about an axis of rotation.

10. The construction method as claimed in claim 9, further comprising adjusting said upstream and downstream guide members so that said axis of rotation is oriented substantially parallel to said tubular core.

11. The construction method as claimed in claim 5, wherein said first deformation surfaces are inclined at an angle greater than 90° relative to said bending plane.

12. An installation for constructing a layer of armor strips around a tubular core of a flexible pipe designed for transporting hydrocarbons, wherein said tubular core stretches longitudinally along an axis of symmetry, said installation comprising:

a supporting wheel having a central recess for allowing said tubular core to pass through said wheel, said armor strips having respectively two substantially parallel opposite faces;

a plurality of guide members mounted on said supporting wheel around said central recess, each of said guide members comprising respectively upstream guide members and downstream guide members;

each armor strip being stretched between said upstream guide members and said downstream guide members so as to enter in an entry direction through said downstream guide members;

said upstream and downstream guide members being offset angularly relative to one another for twisting said armor strip;

said tubular core and said wheel being driven simultaneously, wherein said tubular core is driven through said central recess and said wheel is driven in rotation about said tubular core in a direction of rotation, so as to helically wind said armor strips onto said core, while each of said armor strips is driven in translation through said guide members, said armor strips stretching respectively between said downstream guide members and said tubular core and in a direction for exiting said downstream guide members while causing flat bending of said armor strip, wherein said exit direction is inclined relative to an axial plane containing said axis of symmetry of said tubular core and intersecting said downstream guide members; and, said supporting wheel also comprising an adjusting device for adjusting said downstream guide members so that the two opposite faces of the armor strip entering and exiting said downstream guide members are offset angularly relative to said axial plane in said direction of rotation by an angle greater than 90° for pressing said armor strip flat on said tubular core.

13. The construction installation as claimed in claim 12, wherein said entry and exit directions define a bending plane, said adjustment devices adjust said adjustable downstream guide members so that the two opposite faces of the armor strip entering and exiting said downstream guide members are offset angularly relative to said bending plane in said direction of rotation, by an angle greater than or equal to 90°.

14. The construction installation as claimed in claim 12, wherein said downstream guide members comprise a first pair of first rollers having parallel axes and first facing roll bands, said armor strip being driven in translation between said first rollers, and said first roll bands respectively pressing against said opposite faces.

15. The construction installation as claimed in claim 14, wherein said upstream guide members comprise a second pair of second rollers, said second rollers having parallel axes and second facing roll bands, said armor strip being driven in translation between said second rollers, and said second roll bands respectively pressing against said opposite faces.

16. The installation as claimed in claim 12, wherein said adjustment devices comprise a U-shaped part forming a yoke, said U shaped part having two facing flanges, one of said flanges having a shaft which extends substantially perpendicularly to said flanges and away from the other of said flanges, said shaft being mounted rotatably on said supporting wheel about an axis perpendicular to said wheel, while said downstream guide members are mounted on the other flange of said flanges.

17. The installation as claimed in claim 16, wherein said U-shaped part forming a yoke has a web connecting said flanges, said one of said flanges having a free end opposite to said web, said free end having meshing elements for driving said U-shaped part to pivot about said shaft.

18. The installation as claimed in claim 17, wherein said adjustment devices also comprise a gearwheel mounted coaxially and moveable in rotation against said supporting wheel, and said gearwheel has teeth for interacting with said meshing elements of said free end of said one of said flanges.

19. The installation as claimed in claim 17, wherein said U-shaped part is installed on said supporting wheel so that said free end is oriented toward the center of said wheel.

20. The installation as claimed in claim 16, further comprising said shaft has an extension which passes through said one of said flanges and extends inside said U-shaped part toward said other flange, and said upstream guide members are mounted rotatably on said extension facing said downstream guide members.

21. The installation as claimed in claim 20, wherein said upstream guide members are fitted with a ring gear mounted coaxially on said extension for controlling inclination of said upstream guide members.

22. The installation as claimed in claim 21, wherein said supporting wheel comprises another gearwheel mounted coaxially and moveable in rotation on said supporting wheel, said other gearwheel meshing said ring gear.

23. The installation as claimed in claim 20, wherein said shaft and said extension have an axial bore forming a path for said armor strip.

* * * * *